Patented Mar. 11, 1941

2,234,786

UNITED STATES PATENT OFFICE 2,234,786

TREATMENT OF BOILER FEED WATER

Ernest F. Walsh, Warwick, R. I., assignor to The Narragansett Electric Company, a corporation of Rhode Island No Drawing. Application July 5, 1940, Serial No. 344,075

13 Claims. (Cl. 210—23)

This application is a continuation in part of my co-pending application, Serial No. 160,889, filed August 25, 1937. This invention relates to the treatment of waters used in steam boilers, and in particular to natural waters carrying scale-forming ingredients for use in steam boilers for steam-generating purposes at high boiler pressures; and has for one of its objects the external treatment of the raw boiler feed water in such a manner as to completely remove therefrom, before it is introduced into the boiler, those ingredients which tend to form a hard adherent scale within the boiler at the high operating temperatures and pressures of the latter.

Another object of the invention is to provide clean, dry steam which is free from solids and of a quality that the efficiency and capacity of the prime movers are maintained.

Another object of the invention is the external treatment of the boiler feed water in such a manner that all undesirable adherent scale-forming salts, particularly calcium, magnesium and silica, which cause permanent hardness in the feed water are completely removed prior to its introduction in the boiler, and thereby prevent the formation of sulphates and hydroxides of such salts in the water within the steam boiler.

Another object of the invention is to provide a one-step method of conditioning the raw boiler feed water so as to completely remove from such water before it enters the boiler all the scale-forming materials whereby the treated water may be used directly for boiler feed purposes without subsequent or secondary chemical treatment in the boiler.

Another object of the invention is the provision of a method of treating boiler feed water with a phosphate material irrespective of the pH value of the raw water used so as to obtain substantially complete reaction of the phosphate with the scale-forming solids in the raw water.

Another object of the invention is to provide a method of conditioning natural waters used for boiler feed purposes by treatment outside of the boiler in which the removal of the scale-forming elements and the softening and deaeration of the boiler feed water is effected in a single treating apparatus.

In the continuous operation of steam boilers of large industrial or central power plants for steam generation at high temperatures and pressures, especially those utilizing pressures in excess of 1,000 pounds per square inch gauge, it is essential if optimum conditions are to prevail that there be always available for boiler feed purposes a plentiful supply of water which is free of scale-forming ingredients in order that the formation of hard adherent scale within the boiler be avoided and to obviate corrosion, priming, or other undesirable effects within the steam boiler.

However, raw or natural water of sufficient purity is rarely obtainable as a supply for boiler feed purposes so that the general practice today in the operation of such power plants is to employ some chemical method of treatment for conditioning the water used to render it suitable for boiler purposes.

Various forms of chemical treating materials and their application have heretofore been proposed or are in use which, under controlled conditions, produce a non-adhering scale or sludge, thereby preventing the formation of such destructive scales or incrustations, as calcium sulphate, calcium silicate, magnesium silicate, calcium hydroxide and magnesium hydroxide. The standard methods of relief ordinarily employed for the treatment of the raw feed water to overcome the effects of such undesirable ingredients fall into two groups: (1) By internal conditioning of the water within the boiler by means of chemical substances, and (2) by the chemical treatment of the boiler feed water outside of the boiler before introducing it into the boiler followed by internal treatment.

In commercial power plant operation, the general practice is to utilize the second of the above-named methods of treatment of the water used in the boiler, the first step of which comprises a primary treatment of the raw feed water to soften it before introducing it into the boiler, as by means of either the regular lime-soda process, or by a base exchange process, such as the zeolite process, for removing the major portion of the scale-forming ingredient from the raw feed water. After being subjected to this primary treatment, the feed water is then given a supplementary or secondary chemical treatment after being introduced into the boiler so as to maintain either a carbonate or a phosphate ion concentration in the boiler water to prevent the formation of adherent scale by any scale-forming ingredients not completely removed from the feed water by the preceding primary treatment.

The lime-soda process is commonly used as the primary external method of treatment of the raw boiler feed water where the natural water contains calcium and magnesium salts, causing them to be precipitated in the form of insoluble carbonates in the softener or treating apparatus.

The secondary follow-up treatment of the boiler feed water requiring the addition of chemicals to condition the water in the steam boiler, causes the insoluble, non-adherent sludges to form within the steam boiler. The resulting precipitates in such cases cause deposits which collect on the surfaces of the metal or remain in suspension in the circulating water, thereby requiring frequent blowing down of the boiler water to prevent building up of excessive concentrations within the boiler. Sludge accumulations cause the interruption of proper circulation in parts of the boiler, and the steam produced contains solids which are troublesome and are carried over to adhere to the blading of the turbines and the interior surfaces of other prime movers, thereby resulting in a considerable reduction in their output capacity and impairment of their efficiency.

Of the various standard methods of internal conditioning of the water in the steam boiler, the two principal methods ordinarily used in commercial power plant practice for this secondary treatment are chemical methods of treatment which employ either a carbonate or a phosphate of an alkali metal added to the water in the steam boiler for the prevention of formation of the detrimental adherent scale in the boiler. In the practice of these prior internal conditioning processes, the method generally used for boilers operating at low pressures, namely, those under two hundred pounds per square inch gauge, is the sodium carbonate treatment of the water within the boiler, owing to the convenience and cheapness of this treating material, and one convenient manner in which such a method may be carried out is described in the Patent to Hall, No. 1,613,701 of January 11, 1927.

For high boiler pressures, viz., those above two hundred pounds, it is the practice to add to the water in the boiler a phosphate in place of the carbonate radical, since the former substance is found to decompose less readily as the carbonate at the higher operating pressures. This decomposition of the carbonate increases the hydroxyl radical concentration of the boiler water, which acts to cause dissolution of the metal of the boiler and tends to bring about "caustic embrittlement" within the boiler. This prior phosphate treatment involving the internal conditioning of the water in the boiler and employed as a secondary method of treatment of effluent water from a lime-soda softener is more fully described in the Hall Patents No. 1,613,656, of January 11, 1927 and 1,903,041 of March 28, 1933.

In these patented methods, however, in order that the reactions of the internal treatment may be best accomplished, the pH value of the water must be about 11.0 or 11.5 which with reference to my method is relatively high and to be avoided. However, in carrying out the prior internal treatment of the water in the boiler with the use of phosphates for the prevention of the formation of adherent scale-forming salts, I have found that while the method works satisfactorily at moderate pressures from the standpoint of scale prevention, it is objectionable since its use causes the formation of a precipitate in the boilers consisting primarily of calcium and magnesium phosphates, and excessive carry-over by the steam of these solids which are deposited upon the blading of the prime movers. This type of operation requires frequent cleaning of the equipment to maintain efficiencies and frequent blowing down of a considerable percentage of the boiler water to keep the solids present in the water at a minimum.

Under the present practice of high pressure boiler operation for steam-generation, the concentration of solids in the boiler water cannot be kept to the minimum where steam of desirable quality can be obtained without sacrificing efficiency.

In order to overcome the disadvantages of the prior art methods above described, I have found it to be of advantage to utilize a one-step external method of treatment of the boiler feed water containing the detrimental scale-forming ingredients, before introducing it into the boilers and which will completely remove from the water all of the objectionable scale-forming salts, particularly, calcium, magnesium and silica, and with no subsequent or secondary follow-up treatment of the water in the boiler being employed, as has heretofore been a required step in the practice of prior art processes; and in the improved method which constitutes the present invention I have found that the practice of the same will accomplish all that is possible with the previous two-step methods of treatment involving the combined external and internal conditioning methods, but with the additional result that a superior quality of steam of low moisture and solid content is produced in the boiler which is not possible to secure from the completely treated water by the previous internal methods utilized after the primary softening treatment; the resultant steam of this latter process containing excessive moisture and solids of a quality which detrimentally affects the efficiency and capacity of the prime movers of the system. To this end, I have provided a method of water treatment in which a phosphate of an alkali metal is used, and added to the raw feed water external to the boiler, in conjunction with a catalyst, to cause complete removal of the calcium, magnesium and silica in the feed water. In addition, most of the oxygen and other dissolved gases are also removed from the feed water, after which the water thus treated is passed through suitable filters following the treating tank to remove from the treated water, before its introduction into the boiler, any suspended solids resulting from the chemical reaction in the treating tank and of a size which is too fine to be easily separated by their own weight from the treated water.

In carrying out my novel process I find that I may use a phosphate of an alkaline metal to react with the calcium, magnesium and silica in the raw water external to the boiler, and while this phosphate formerly did not cause a complete conversion of the mineral solids unless there was present heat and a relatively pH value, such as 11.0 or 11.5, I am enabled by the use of a catalyst such as for instance, an iron ion, to obtain a complete reaction of the phosphate with the calcium and magnesium with lesser heat and in water having a lower pH value. It is desirable that the boiler feed water have a lower pH value in order that there will be less carrying-over of solids by the steam into the blading of the prime movers of the system.

In carrying out this process the hydrogen iron concentration or pH value of the water under treatment determines the particular form of phosphate to be used. At present in the carrying out of my invention I prefer to employ disodium phosphate having a chemical formula of $Na_2HPO_4.H_2O$ as a source of the phosphate radical, but I may also use other well-known forms of sodium phosphate such as sodium tribasic phosphate $Na_3PO_4.H_2O$ or sodium monobasic phosphate $NaH_2PO_4.H_2O$ with equally satisfactory results, the form selected depending upon the pH value of the raw water to be treated and the pH value of the catalyst to be added.

In practice of the present invention, a slight excess over the theoretical amount of an alkali phosphate of the proper form for the pH value of the raw water to be treated is added to the water undergoing treatment in the treating apparatus where settling is permitted in proportions to combine with all the calcium and magnesium present in the water. When such a condition results, the water will have zero hardness since it is the calcium and magnesium salts which influence the hardness of water and will be completely removed from the water as precipitated phosphates. This is done by testing the effluent from the treating apparatus for hardness and pH value, since any deviation from zero hardness will indicate the presence of unremoved calcium and magnesium salts in the water, and adjusting the proportioning of the relative amounts of phosphate, ferric chloride, and hydroxide so that zero hardness results.

As above stated, the proper phospate which is to be added would be that which would produce complete removal of the calcium with due reference to the pH value of the water, and is preferably used in proportions sufficient to maintain an excess phosphate concentration in the effluent after treatment. For example, if the raw water has a low pH value of from 9.6 to 9.8, then the alkaline type of phosphate is used. If, however, the raw water has a pH of 10.8, it will be necessary to use a slightly acid type of phosphate, such as mono-sodium phosphate, in order to reduce the high alkalinity of the water to the pH desired. I have found an effluent of 8.3 satisfactory. On the other hand, if pH of the water is extremely high, as for instance, it showed to be greater than 12, this high alkalinity will require the addition of an acid, such as sulphuric acid. It will, therefore, be seen that the form of phosphate which is employed is a function of the pH value of the water to be treated, and accordingly the choice is left to the mechanical determination by the chemist as to which particular form of phosphate shall be employed in order to secure the complete conversion of the calcium and magnesium salts at the optimum pH.

In order that I may precipitate the solids in the boiler feed water at a desirable pH value which will be low in comparison to that heretofore used, I employ a catalyst in the form of an iron ion in the presence of a hydroxide, the preparation being formed under controlled temperature and pH value and is fed to the feed water treating tank for the purpose of being present at the time the reaction of the phosphate is carried forward.

In brief, the essential chemicals are phosphates in the form of some ortho-salt, ferric iron as the sulphate chloride or hydroxide, and sodium hydroxide. By varying the combination of these chemicals and conditions of treatment, any alkilinity may be obtained. The chemicals are mixed in a separate tank at a controlled temperature with some of the water to be treated so that a fairly concentrated solution results, having a pH value of about 11.2. This solution is then proportioned to the water in a hot process softener and after filtering the effluent has a pH value of 7.8 to 8.5 and a hardness that is barely measureable. In addition, the total solids are less than in the original water and the calcium and magnesium are reduced to a figure apparently below their own solubility products. These apparently abnormal results can be explained by theoretical considerations even though definite practical proof of the explanation may be lacking.

The scale-forming ions (Ca and Mg) are removed from solution by precipitation as tri-calcium and tri-magnesium phosphates at the pH specified, and the iron forms the hydroxide which acts as a catalyst. Any excess iron and phosphate would precipitate iron phosphate which would coagulate until all the iron is used and free phosphate is left in the water. While this explanation has not been abandoned, another consideration makes the explanation more logical and leaves very little not explained. That is the existence, or rather, formation of micelles in the treating solution which allows the entire field of colloidal chemistry for an explanation. Experimental evidence indicates that the iron, caustic, and phosphate forms a complex colloidal compound of indeterminate composition, but negatively charged and highly reactive toward positive ions such as calcium and magnesium—when enough such ions are absorbed the particles lose their excess negative charges: they are no longer peptized and coagulation takes place. The very large surface area of the micelles makes almost inevitable the adsorption of some soluble ions of mixed charges and thus cause the lowering in total solids in the treated water.

The positive ions of calcium and magnesium are attracted by the negative ions in the micelle and by adsorption they are precipitated as particles. If calcium and magnesium in a soluble form are added to water thus treated, coagulation occurs. Such a solution contains particles which will remove from the solution or coagulate the positive charged ions of the alkaline-earth series.

The amount of the catalyst to be present in order to obtain zero hardness should be between .5 and 5 parts per million of the iron ion to the boiler feed water on the basis of weight. A preferred amount and one which I have found to be entirely satisfactory is 2 parts per million of the ferric ion; for instance, if I wish two pounds of ferric ion present for one million pounds of boiler feed water and I am using ferric sulphate $Fe_2(SO_4)_3$, I may calculate the amount of the ferric sulphate to be used on the basis of the atomic weight of the ferric sulphate and the ferric ion present in the compound. For instance, the atomic weight of ferric sulphate is 399.86 which, divided by the atomic weight of the two ferric ion atoms present, 11.68, equals a factor of 3.58041. Multiplying this by two pounds, the value is 7.16082 pounds of ferric sulphate necessary, provided that the ferric sulphate is 100% pure. If, however, the ferric sulphate be on the basis of 91%, I must then use the larger quantity of ferric sulphate found by dividing 7.16082 by .91 which equals 7.87 pounds of 91% ferric sulphate which would be used for the million parts of water by weight which is to be treated.

The same mathematics may be carried out in calculating the number of pounds of ferric chloride which would be present which if ferric chloride of 40.5% pure is used would be 14.35 pounds of ferric chloride necessary to provide the two parts per million of ferric ion to be employed with a million parts of water by weight. I have limited the range of between one-half and five parts per million, as I have found that when a large quantity of ferric ion is used, such for instance, as ferric chloride or ferric sulphate, in an amount such for instance as 50 parts per million, that cloudiness or color of the resultant treated water occurs and that a coagulant effect rather than a catalytic effect is produced.

In accordance with my present invention, the iron ion, acting as a catalyst, speeds up the chemical reaction of the phosphate with the calcium and magnesium salts, since without the presence of any catalyst the action is found to be slowed down appreciably, preventing the complete reaction between the calcium and magnesium salts and the phosphate. The reaction continues as the treated water passes through the feed pumps, heaters and feed lines from the deaerator to the steam boiler causing troublesome deposits. However, when the phosphate is used in conjunction with the small amount of catalyst in accordance with the present invention, the phosphate reaction is completed rapidly in the time during which the water undergoing treatment is in the deaerator treating apparatus, which usually occupies a period of about an hour, so that all of the calcium and magnesium salts are precipitated out of the raw water and there is no further chemical reaction with any such scale-forming substances along the path of the feed water as it is fed to the boiler.

In one form of my invention, as at present practiced, I prefer to employ my process in connection with the treatment of raw water containing scale-forming solids, the treated water being used in the boilers of a steam-generating plant of the jet condensing type, in which the make-up water fed to the steam boilers to compensate for the loss of steam, amounts to an average of 85% drawn from the city mains. As an illustrative example, the analysis of one typical specimen of raw make-up water used, showed:

| | Parts per million |
|---|---|
| Dissolved mineral solids | 36.5 |
| Dissolved organic solids | 22.5 |
| Total solids | 59.0 |
| Silica, $SiO_2$ | 1.00 |
| Oxides of iron and alumina, $Fe_2O_3$ $Al_2O_3$ | 3.00 |
| Dissolved metallic ions | |
| Calcium, $Ca^{++}$ | 8.93 |
| Magnesium, $Mg^{++}$ | 1.201 |
| | 10.13 |
| Dissolved non-metallic ions | |
| Bicarbonate, $HCO_3$ | 5.73 |
| Carbonate, $CO_3$ | 6.96 |
| Chloride, Cl | 9.28 |
| Sulphate, $SO_4$ | 4.61 |
| | 25.58 |
| Hydrogen ion conc. expressed as pH | 9.93 |
| Carbonate ($CO_3$) alkalinity as $CaCO_3$ | 11.6 |
| Bicarbonate ($HCO_3$) alkalinity as $CaCO_3$ | 4.7 |
| Total | 16.3 |
| Calcium hardness alkalinity as $CaCO_3$ | 22.28 |
| Magnesium hardness alkalinity as $CaCO_3$ | 4.94 |
| Carbonate hardness alkalinity as $CaCO_3$ | 16.30 |
| Non-Carbonate hardness alkalinity as $CaCO_3$ | 15.74 |
| Total hardness | 32.04 |

As a specific example of my invention, I pass the raw water through a feed water heater of appropriate construction, as is well known in the art, in which the temporary hardness in the raw water is removed by boiling, which operation usually requires a period of from thirty minutes to an hour, in order to obtain precipitation of the calcium and magnesium carbonates and bicarbonates to the limit of solubility. For such purposes, however, I prefer to use the Cochrane type of apparatus, which construction combines the deaerator with a feed water heater. During the course of the operation of this form of heater, a temperature of approximately 230° F. is maintained inside the apparatus in which the water being treated is heated by direct contact with extracted steam at about eight pounds gauge pressure. It is also desirable that this apparatus have a capacity equivalent to the maximum hourly demand of the boilers, and also be of such a construction that the precipitated products of reaction may be easily drawn off while the equipment is in service.

As deaeration of the water in the feed water heater apparatus goes on to remove oxygen and other gases therein, the treating chemicals comprising the phosphate and the catalyst for removing ingredients which impart permanent hardness to the raw water, viz., the calcium, magnesium and silica salts; are added. For practical reasons, it is desirable that the phosphate and catalyst used for treatment of the boiler feed water shall be added so as to bear a definite relation to the rate of flow of the water to the deaerating apparatus or treating tank. In practice, this is attained by the use of a so-called mechanical proportioning device which preferably shall be of a construction capable of adjustment for providing a variety of different rates of injection of the treating chemicals. This device preferably is adjusted to feed the iron catalyst which is in the form of an iron ion in solution and obtained from the ferric hydroxide, the ferric chloride or ferric sulphate in a ferric hydroxide form as above stated, into the feed water undergoing treatment at the same time as the phosphate and at the rate of approximately two parts of the iron ion to one million parts of water, and with sufficient phosphate of the proper form for the pH of the water to be treated and slightly in excess of the volume theoretical requirement to maintain in the effluent leaving the deaerating softener apparatus a phosphate concentration of from one-half to five parts per million so that the resultant completely treated water will have zero hardness. At the conclusion of this process, the treated water is found to have from 95% to 99% of the calcium and magnesium salts precipitated out while suitable filters remove the rest of the suspended solids. Any sulphates, oxides of iron and alumina contained therein as soluble salts will, however, go through into the boiler without being precipitated or removed from solution in the feed water.

In order that the phosphate and the catalyst materials, which in their commercial form usually are in powdered condition, may be incorporated in the water to be treated so that a uniform mixture will result, I preferably add these materials to the water in the treating tank in the form of a previously prepared solution, which is fed to the treating tank at the desired rate of feed by the so-called "mechanical proportioning" device. As a specific example of such a treating solution which may be used for treating raw water of the above composition and having a pH of 9.93, a solution of di-sodium phosphate ($Na_2HPO_4.H_2O$) has been successfully employed.

The normal quantity of water including the necessary steam to heat it to 230° F. for this case and which is to be treated for the removal of all scale-forming salts is 850,000 pounds per hour. In proportion this amount equals about 85% city water as represented by the above analysis and 15% condensed steam. A chemical mixing tank having a capacity of 30,000 pound of water is used to dissolve the various chemicals used for treatment and keeps them in an agitated solution to be fed to the proportioner as indicated by the demand. Each 30,000 pounds of water in the mixing tank has dissolved in it 1½ pounds of ferric sulphate, 64.0 pounds of di-sodium phosphate, 4.5 pounds of caustic soda. The resultant solution is proportioned mechanically to the water softener so that for each 100,000 pounds of water treated, 2.759 pounds of di-sodium phosphate, 0.282 pound of caustic soda, and 0.028 pound of ferric sulphate are added. The weights of chemicals specified to be added produce a solution having a pH value of approximately 11.2. The pH value of this solution is maintained regardless of the quantities of chemicals required for treatment of the boiler water.

With the chemical feed as indicated, the reaction acts to remove calcium and magnesium to quantities below their stoichiometric quantities accomplished by chemical reaction and by adsorption, all occurring in a solution of controlled pH value, which shall not be less than 7.8 and which is 8.3 in the case illustrated. All of the calcium and magnesium as indicated is now in an insoluble state of which up to 99% has precipitated in the reaction chamber. The treated water then passes to anthracite filters where all of the remaining suspended solids are removed thus producing crystal clear water having zero hardness and a pH value of 8.3.

While various filter constructions may be employed to mechanically remove the suspended solids in the treated water to provide a clear effluent, I preferably utilize filters filled with anthracite which is not affected by the phosphate solution, since standard filters employing calcite are not well adapted for this use, due to the fact that phosphate readily acts on the calcite material. Provision is also made in the filter construction for back washing in order to clean the filter bed of the solids which plug the pore spaces.

It will, therefore, be apparent that an essential feature of this invention resides in providing completely treated boiler feed water of relatively low pH value, in which form cleaner steam is generated, and in which there are relatively less solids carried by the steam.

By carrying out the above procedure, it is found that water treated in accordance with the present invention is satisfactory for all boiler pressures encountered in present power plant operation. Also, the application of this method of treatment is particularly desirable where added economy of high pressures are desired and when, due to the nature of the work, raw water must be used for boiler feed. It also is an advantage, as in a case where jet condensers are installed and where by necessity it is necessary to use raw water for boiler feed purposes. Under these conditions it is imperative that the boilers, in order to operate at high capacities and at the same time produce clean steam, be free of scale and sludge.

Having thus described one illustrative embodiment of my invention and the best mode known to me for carrying out my method, I desire it to be understood that although specific terms are employed, they are used in a generic and descriptive sense, and not for the purpose of limitation, the scope of the invention being defined and limited only by the terms of the appended claims.

I claim:

1. The process of softening water containing an alkaline-earth metal compound to produce soft water for use in steam boilers, which comprises adding to the water a phosphate material of the group consisting of the ortho-phosphates of the alkali metals to supply a phosphate radical in an amount sufficient to combine with all of the alkaline-earth metal present in the water upon complete reaction of the phosphate, and adding an iron compound which will produce iron ions in an amount not in excess of five parts per million by weight of the treated water but sufficient to act as a catalyst and cause complete reaction of the phosphate with the alkaline-earth metal and form a phosphate complex ortho-phosphate precipitate therewith.

2. The process of softening water containing an alkaline-earth metal compound to produce soft water for use in steam boilers, which comprises adding to the water a phosphate material of the group consisting of the ortho-phosphates of the alkali metals to supply a phosphate radical in an amount sufficient to combine with all of the alkaline-earth metal present in the water upon complete reaction of the phosphate, and adding a compound selected from a group consisting of the chlorides and sulphates of the iron to produce iron ions in an amount not in excess of five parts per million by weight of the treated water but sufficient to act as a catalyst and cause complete reaction of the phosphate with the alkaline-earth metals to form a phosphate complex precipitate therewith.

3. The process of softening water containing an alkaline-earth metal compound to produce soft water for use in steam boilers, which comprises adding to the water a phosphate material of the group consisting of the ortho-phosphates of the alkali metals to supply a phosphate radical in an amount sufficient to combine with all of the alkaline-earth metal present in the water upon complete reaction of the phosphate, and adding a compound selected from a group of ferric salts consisting of the chlorides and sulphates of the iron to produce iron ions in an amount not in excess of five parts per million by weight of the treated water but sufficient to act as a catalyst and cause complete reaction of the phosphate with the alkaline-earth metals to form a phosphate complex precipitate therewith.

4. The process of softening water containing an alkaline-earth metal compound to produce soft water for use in steam boilers, which comprises adding to the water a phosphate material of the group consisting of the ortho-phosphates of the alkali metals to supply a phosphate radical in an amount sufficient to combine with all of the alkaline-earth metal present in the water upon complete reaction of the phosphate, and adding an iron compound which will produce iron ions in an amount between one-half of one part and five parts per million by weight of the treated water to act as a catalyst and cause complete reaction of the phosphate with the alkaline-earth metal and form a phosphate complex precipitate therewith.

5. The process of softening water containing an alkaline-earth metal compound to produce soft water for use in steam boilers, which comprises adding to the raw water an ortho-phosphate of the alkali metals to cause to be present a phosphate radical in an amount sufficient to combine with all of the alkaline-earth metals present in the water upon complete reaction of the phosphate, and adding an iron compound which will produce iron ions in an amount substantially two parts per million by weight which functioning as a catalyst causes complete reaction of the phosphate and the alkaline-earth metals to form a phosphate complex precipitate therewith.

6. The process of softening water containing an alkaline-earth metal compound to produce soft water for use in steam boilers, which comprises adding to the water a phosphate material of the group consisting of the ortho-phosphates of the alkali metals to supply a phosphate radical in an amount sufficient to combine with all of the alkaline-earth metal present in the water upon complete reaction of the phosphate, and adding a hydroxide and an iron compound which will produce iron ions in the presence of a hydroxide in an amount not in excess of five parts per million by weight of the treated water but sufficient to act as a catalyst and cause complete reaction of the phosphate with the alkaline-earth metal and form a phosphate complex ortho-phosphate precipitate therewith.

7. The process of softening water containing an alkaline-earth metal compound to produce soft water for use in steam boilers, which comprises adding to the water a phosphate material of the group consisting of the ortho-phosphates of the alkali metals to supply a phosphate radical in an amount sufficient to combine with all of the alkaline-earth metal present in the water upon complete reaction of the phosphate, and adding a compound selected from a group consisting of the chlorides, sulphates, and hydroxides of iron to produce iron ions in an amount not in excess of five parts per million by weight of the treated water but sufficient to act as a catalyst and cause complete reaction of the phosphate with the alkaline-earth metals to form a phosphate complex precipitate therewith.

8. The process of softening water containing an alkaline-earth metal compound to produce soft water for use in steam boilers, which comprises adding to the raw water an ortho-phosphate of the alkali metals to cause to be present a phosphate radical in an amount sufficient to combine with all of the alkaline-earth metals present in the water upon complete reaction of the phosphate, and adding an iron and hydroxide compound which will produce iron ions in an amount substantially two parts per million by weight which functioning as a catalyst causes complete reaction of the phosphate and the alkaline earth metals to form a phosphate complex precipitate therewith.

9. The process of softening raw water containing an alkaline-earth metal compound to produce soft water for use in steam boilers, which comprises initially determining the pH of the raw water, and then on the basis of such pH determinations selecting the type of phosphate material from the alkali metal phosphates to be used which, if present in the raw water in an amount sufficient to completely react and combine with all of the alkaline-earth metal to produce final soft water of zero hardness, will also produce when dissolved a pH value of substantially 8.3, adding to the water the selected phosphate having such characteristics and in an amount sufficient to combine with all of the alkaline-earth metal in the raw water upon the complete reaction of the phosphate, and adding a compound selected from a group consisting of the chlorides or sulphates of the iron and in an amount to produce iron ions not in excess of five parts per million of the treated water for functioning as a catalyst to cause the phosphate to react to completion and combine with all of the alkaline-earth metal whereby substantially the complete removal of the alkaline-earth metal from the water undergoing treatment will be secured and after settling, soft water of substantially zero hardness having a pH value of substantially 8.3 will be obtained.

10. The process of preventing the formation of adherent scale in steam boilers by steam boiler water, which comprises maintaining a continuous feed of raw water containing an alkaline-earth metal compound into water-softening equipment in the feed line to steam boilers, treating the raw water passing through said water-softening equipment by making additions to the water therein of a phosphate material which is an amount sufficient to combine with all of the alkaline-earth metal present in the water if reaction of the phosphate therewith is allowed to go to completion, causing the phosphate to react with the alkaline-earth metal in the presence of iron ions in an amount sufficient to act as a catalyst to cause the phosphate to react to completion and combine with all of the alkaline-earth metal and form a phosphate complex precipitate therewith whereby substantialy the complete removal of the alkaline-earth metal from the raw water being treated is secured and soft clear water of zero hardness is obtained after settling and removal of the precipitated material, and maintaining a continuous feed through the feed line to the steam boilers of the effluent of soft clear zero-hardness water thus formed in the water-softening equipment.

11. The process of softening raw water containing an alkaline-earth metal compound to produce soft water for use in steam boilers, which comprises maintaining a continuous flow of raw feed water, initially determining the pH of the raw water, and then on the basis of such pH determinations selecting a phosphate material of a type which if present in solution in the raw water in an amount sufficient to react to completion and combine with all of the alkaline-earth metal will give a pH of 8.3 and will produce after settling of the precipitated materials soft clear water of zero hardness, adding to the raw water prior to its introduction into the boiler an iron compound and a phosphate material of such selected type and in a quantity sufficient to react to completion with all of the alkaline-earth metal, said phosphate material being selected from the group of ortho-phosphates of the alkali metals, and said iron compound being selected from the group of ferric salts consisting of ferric chloride and ferric sulphate, allowing the reaction of the phosphate with the alkaline-earth metal to proceed to completion in the presence of the iron compound which will serve to supply ferric ions into the water in an amount sufficient to act as a catalyst and not in excess of five parts per million of the treated water to cause the phosphate to go to completion and combine with the alkaline-earth metal and form a phosphate complex precipitate therewith whereby substantially the complete removal of the alkaline-earth metal from the water undergoing treatment is secured and a soft clear water of zero hardness having a pH value of 8.3 will be obtained after removal of the precipitated material, thereafter checking from time to time the phosphate radical concentration and hardness of the softened water thus treated, and on the basis of such determinations making additions as required of additional quantities of the phosphate material and the iron compound in the same relative ratio as when used in the initial softening treatment of the raw water and in amounts sufficient to maintain in the final soft water when fed to the boiler an excess phosphate concentration for complete reaction and an iron ion concentration of not in excess of five parts per million but sufficient to act as a catalyst.

12. The process of softening raw water containing an alkaline-earth metal compound to produce soft water for use in steam boilers, which comprises initially determining the pH of the raw water, and then on the basis of such pH determinations selecting the type of phosphate material from the alkali metal phosphates to be used which, if present in the raw water in an amount sufficient to completely react and combine with all of the alkaline-earth metal to produce final soft water of zero hardness, will also produce when dissolved a desired pH value adding to the water the selected phosphate having such characteristics and in an amount sufficient to combine with all of the alkaline-earth metal in the raw water upon the complete reaction of the phosphate, and adding a compound selected from a group consisting of the hydroxides, chlorides or sulphates of iron and in an amount to produce iron ions not in excess of five parts per million of the treated water for functioning as a catalyst to cause the phosphate to react to completion and combine with all of the alkaline-earth metal whereby substantially the complete removal of the alkaline-earth metal from the water undergoing treatment will be secured and after settling, soft water of substantially zero hardness having a desired pH value will be obtained.

13. The process of softening raw water containing an alkaline-earth metal compound to produce soft water for use in steam boilers, which comprises maintaining a continuous flow of raw feed water, initially determining the pH of the raw water, and then on the basis of such pH determinations selecting a phosphate material of a type which if present in solution in the raw water in an amount sufficient to react to completion and combine with all of the alkaline-earth metal will give a desired pH and will produce after settling of the precipitated materials soft clear water of zero hardness, adding to the raw water prior to its introduction into the boiler a hydroxide compound containing iron and a phosphate material of such selected type and in a quantity sufficient to react to completion with all of the alkaline-earth metal, said phosphate material being selected from the group of orthophosphates of the alkali-metals, and said iron in the hydroxide compound being obtained from the group of ferric salts consisting of ferric chloride and ferric sulphate and ferric hydroxide, allowing the reaction of the phosphate with the alkaline-earth metal to proceed to completion in the presence of the iron compound which will serve to supply ferric ions into the water in an amount sufficient to act as a catalyst and not in excess of five parts per million of the treated water to cause the phosphate to go to completion and combine with the alkaline-earth metal and form a phosphate complex precipitate therewith whereby substantially the complete removal of the alkaline-earth metal from the water undergoing treatment is secured and a soft clear water of zero hardness having a desired pH value will be obtained after removal of the precipitated material, thereafter checking from time to time the phosphate radical concentration and hardness of the softened water thus treated, and on the basis of such determinations making additions as required of additional quantities of the phosphate material and the iron compound in the same relative ratio as when used in the initial softening treatment of the raw water and in amounts sufficient to maintain in the final soft water when fed to the boiler an excess phosphate concentration for complete reaction and an iron ion concentration of not in excess of five parts per million but sufficient to act as a catalyst.

ERNEST F. WALSH.